June 21, 1960
D. L. SHERER
2,941,811
SEEDER AND SPREADER
Filed April 24, 1958
3 Sheets-Sheet 1
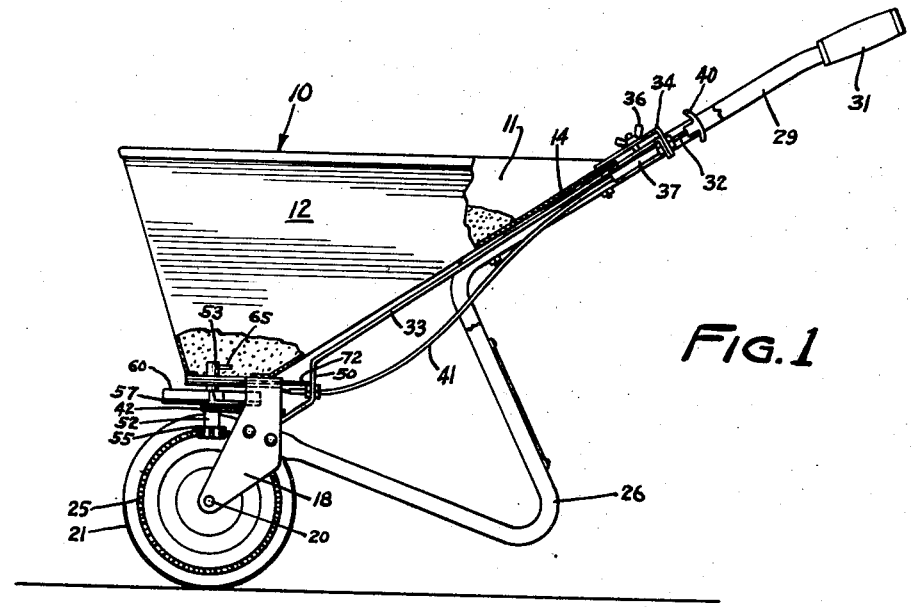
FIG. 1
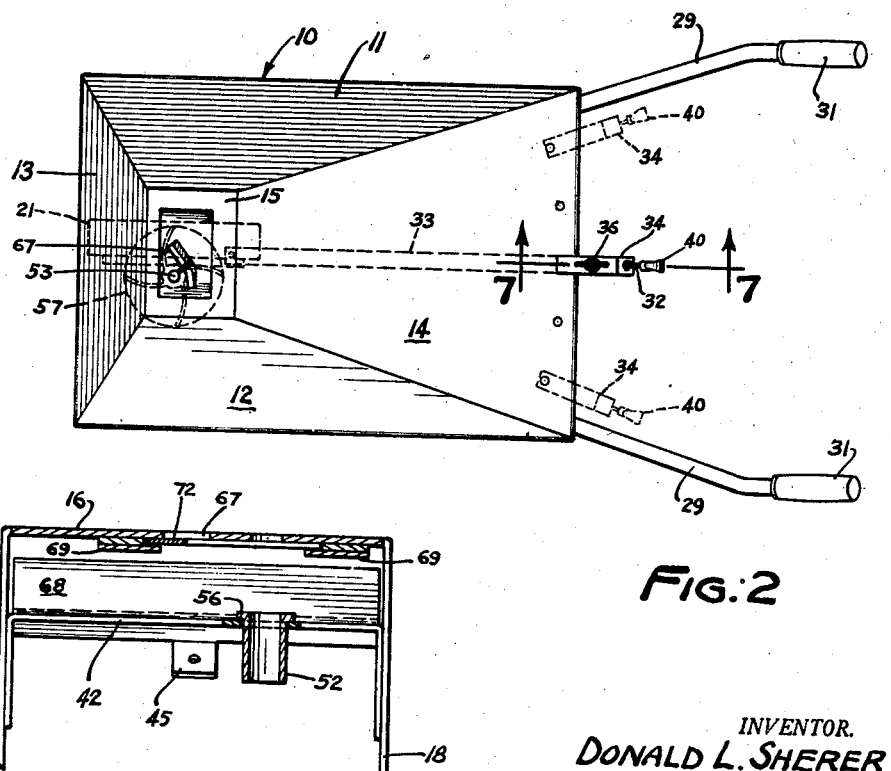
FIG. 2
FIG. 10
INVENTOR.
DONALD L. SHERER
BY
Moore, White & Burd
ATTORNEYS

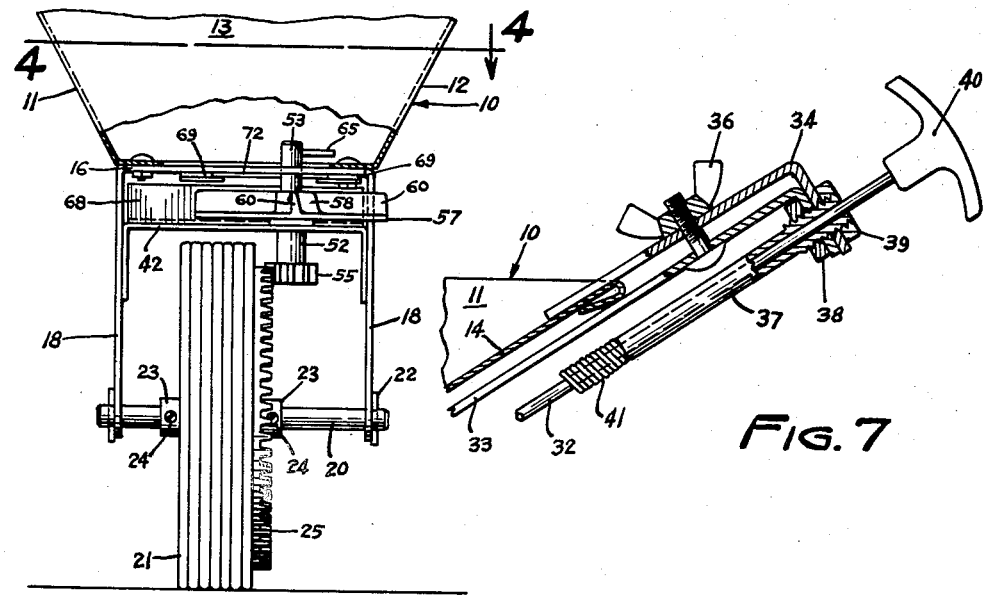
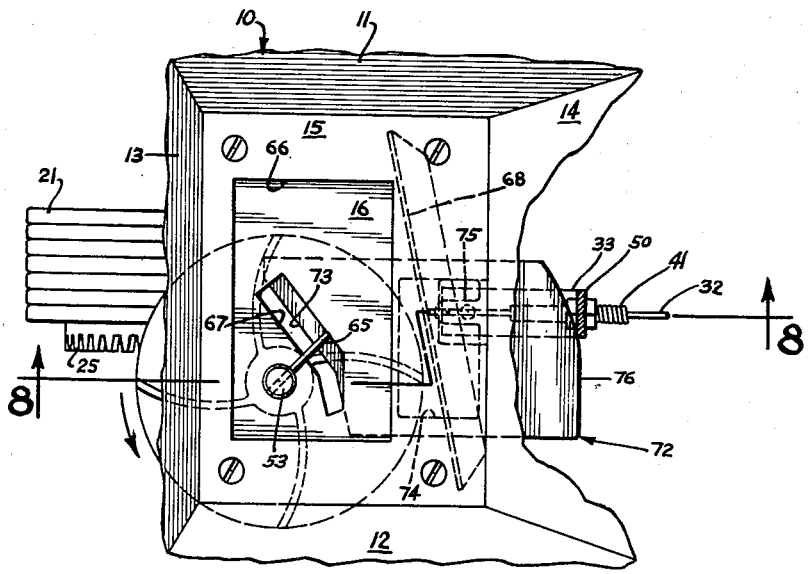

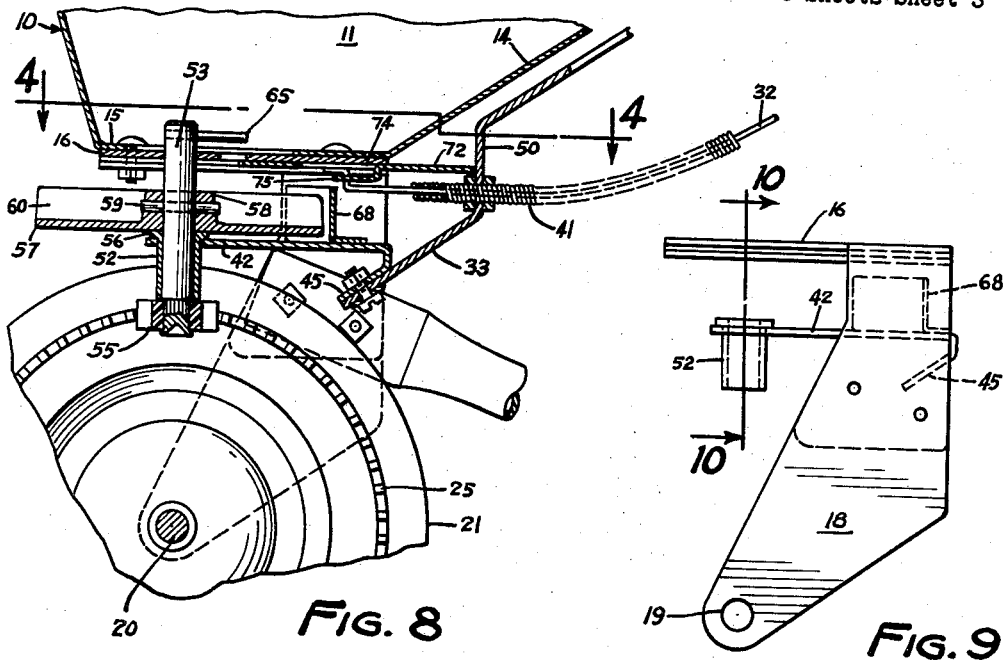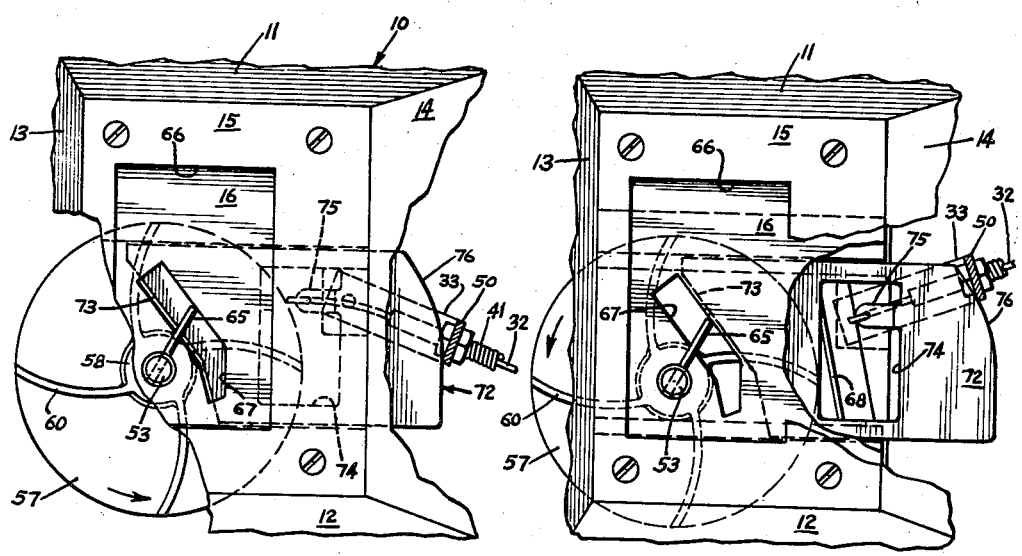

United States Patent Office 2,941,811
Patented June 21, 1960

2,941,811

SEEDER AND SPREADER

Donald L. Sherer, 3959 Dakota Ave., St. Louis Park, Minn.

Filed Apr. 24, 1958, Ser. No. 730,607

5 Claims. (Cl. 275—8)

This invention relates to new and useful improvements in seeders and spreaders of the general type disclosed and claimed in my earlier Patent No. 2,661,955, granted December 8, 1953.

An apparatus of the general type for broadcasting lawn seeds and commercial fertilizers and the like should be extremely simple and inexpensive. It should be positive in operation; should be quickly adjustable to vary the discharge of material therefrom without the use of special tools; and should be readily maneuverable over the ground surface by an operator. In addition, the broadcasting mechanism should be so constructed that the operator may clearly note, at all times, the spread of the broadcast material over the ground surface, thereby to avoid misses between adjacent "swaths" of the broadcast material and thus assuring more uniform application of the material.

The present invention is therefore directed to the problem of providing an effective and highly efficient seeder and spreader having means for uniformly distributing materials, such as grass seed or fertilizer over the surface of the ground, whereby the operator may be assured that the layer of material being applied will be uniform over the entire area so treated.

A further and more specific object of the invention resides in the provision of a seeder and spreader comprising a hopper having a discharge opening in its bottom wall normally closed by a slide valve having an operating member conveniently located adjacent to the operating handles of the apparatus whereby the slide valve may be readily manipulated, when necessary, to change the flow of material from the hopper to the distributor wheel of the apparatus, said discharge opening and slide valve being so related to one another that the delivery of the material over the ground surface will be uniform at all times regardless of whether the slide valve is wide open or only partially open.

A further and more specific object of the invention resides in the location of the distributor wheel with respect to the valve discharge opening in the bottom of the hopper, whereby the distribution of the material onto the ground surface will be uniform regardless of the speed at which the apparatus may be moving over the surface of the ground.

Other objects of the invention reside in the simple construction of the agitator means provided in the bottom of the hopper for preventing bridging of the material over the discharge opening under certain operating conditions; in the dual control means for regulating the flow of material from the hopper, said means comprising a member adapted to vary the size of the discharge opening to control the rate of flow, and another member for completely closing the discharge opening to interrupt flow of the material from the hopper whenever the apparatus is brought to rest; and in the simple and inexpensive construction of the material distributing means of the apparatus whereby the apparatus may be manufactured at extremely low cost, a highly desirable attribute in an apparatus of this general type.

To the accomplishment of the foregoing and related ends this invention then comprises the features hereinafter fully described and particularly pointed out in the claims, the following description setting forth in detail certain illustrative embodiments of the invention, these being indicative however of but a few of the various ways in which the principles of the invention may be employed.

The invention will be described with reference to the drawings, illustrating an exemplary form of apparatus in which corresponding numerals refer to the same parts, and in which:

Figure 1 is a side elevation of the improved broadcast seeder and spreader herein disclosed, with parts broken away;

Figure 2 is a top plan view of the apparatus showing in full and broken lines, three positions of the adjustment arm for controlling the rate of flow of the material from the hopper;

Figure 3 is an enlarged detail partial front elevation, partly broken away and partly in section, showing the driving means for the distributor wheel and agitator;

Figure 4 is a fragmentary plan view of the bottom of the hopper taken substantially on the line 4—4 of Figures 3 and 8 and in the direction of the arrows showing the slide valve and agitator, the slide valve being shown partially open;

Figure 5 is a fragmentary plan view similar to Figure 4 showing the slide valve in almost closed position;

Figure 6 is a fragmentary plan view similar to Figure 5, showing the slide valve in wide open position;

Figure 7 is an enlarged detail side elevation in section on the line 7—7 of Figure 2, looking in the direction of the arrows, and showing the dual control means for regulating and controlling the rate of flow of material from the hopper;

Figure 8 is an enlarged side elevation in section on the line 8—8 of Figure 4, looking in the direction of the arrows, and showing details of the agitator, the control valve, and the distributor wheel;

Figure 9 is a side elevation showing in isolation the yoke assembly for housing the material distributing means; and Figure 10 is a front elevation in section taken on the line 10—10 of Figure 9 and in the direction of the arrows showing the slide valve and the bearing supporting the distributor wheel and agitator.

Referring now to the drawings, and particularly to Figures 1 and 2, the exemplary form of apparatus illustrated therein comprises a hopper, generally designated by the numeral 10, having angularly inclined upright side walls 11 and 12, front and rear walls 13 and 14, and a bottom wall 15 assembled generally in the form of a hollow, non-equilateral, inverted, truncated pyramid. The upright walls 11, 12, 13 and 14 are positioned at such an angle that materials delivered into the hopper will be drawn downward by the force of gravity onto bottom wall 15, as will readily be understood. Hopper 10 may be constructed of any suitable material such as metal, wood, plyboard, and the like.

Hopper 10 is shown secured by bolts or rivets or the like to the upper horizontal plate portion of a U-shaped yoke member, generally designated by the numeral 16, as best shown in Figure 3. The yoke member is formed with a pair of laterally spaced vertically disposed depending legs 18, each having an aperture 19 at its lower end for receiving an axle or shaft 20 upon which a suitable traction or drive wheel 21 is rotatably mounted. The ends of axle 20 are preferably secured against relative rotation in the apertures in the lower ends of leg members 18 and held in place by pins 22. A pair of collars 23, each rigidly secured to axle 20 by a set screw 24, retains the traction wheel 21 in proper rotatable position thereon. An annular ring gear 25 is secured to one side of the traction wheel 21.

A pair of leg members 26, preferably of tubular stock to gain lightness and maximum strength, cooperates with the traction wheel 21 to support the hopper in its load receiving position, as will be understood by reference to Figure 1. The leg members are generally V-shaped and their forward extensions are secured to the depending legs 18 of the U-shaped yoke member by suitable rivets or bolts or the like. The rearward extensions of leg members 26 are bent backwardly and extend upwardly along the wall 14 of the hopper 10 and are secured thereto. These upwardly inclined portions extend beyond the rear top edge of the hopper to provide a pair of spaced handles 29 similar to those on a wheelbarrow, and have grips 31 fitted over their free ends. Although in the drawings the rearwardly extending handle portions 29 of the leg members 26 are shown formed integrally therewith, it will be apparent that the handle portions 29 may, however, be made independently of the leg portions 26, whereby the handles may be detached from the hopper to reduce the overall size of the device to facilitate shipping, storage, etc.

Referring particularly to Figures 1 and 7, the upper ends of a flexible rod 32 and a control arm 33 are shown attached to the upper edge of rear wall 14 by means of an L-shaped clamp member 34 whose long arm extends over the upper edge of rear wall 14 and is clamped thereto by means of a bolt and wing nut 36 which extends through both control arm 33 and clamp member 34 to draw them together. Clamp member 34 secures and holds the control arm 33 in the desired position along the upper edge of rear wall 14. The position of control arm 33 will set the slide valve at the desired position within the discharge opening as hereinafter explained. The upper end of control arm 33 is bent in the form of an L so that it fits in abutment with the outer end of the short arm of L-shaped clamp 34. The threaded shank of a tube 37 is fastened in place by nuts 38 and 39 in holes in the abutting bent-over ends of control arm 33 and clamp member 34. Flexible rod 32 is passed through tube 37 and provided at its outer end with a handle 40. A flexible tubular conduit 41 is secured to the lower end of tube 37 and extends substantially along the entire length of flexible rod 32 to resiliently hold the latter in position.

A triangular shaped plate member 42 is positioned within the laterally spaced depending legs 18 of the yoke member 16 spaced below the upper horizontal wall portion of yoke member 16. Plate 42 has a pair of downturned flanges which fit securely against the inner surface of depending legs 18 and are secured thereto by the same bolts or rivets which fasten leg members 26. The trailing edge of member 42 has an integral flange having a central lug or tongue 45 to which the lower offset end of control arm 33 is pivotally attached, as by means of a nut and bolt or equivalent means, as shown in Figure 8. The lower end of control arm 33 is slightly offset vertically to provide a portion 50 which is disposed in a vertical direction substantially parallel to the vertical axis of the device. The lower end of the flexible conduit 41 is locked in an aperture in the lower part of vertical portion 50 of control arm 33. Thus, flexible rod 32 moves along with the control arm 33 when the control arm is moved on its pivot or tongue 45.

The apex of plate 42 is suitably apertured to suspend a bearing 52 therein, which in turn journals rotatable drive shaft 53. Pinion gear 55, made of nylon or metal or other suitable material, is keyed to shaft 53 immediately below bearing 52 for rotatable engagement with ring gear 25. It is readily seen that the rotation of drive wheel 21 and hence ring gear 25 in a vertical plane is translated into the rotation of shaft 53 by pinion 55 in a horizontal plane. The upper end of bearing 52 is extended outwardly to form a flange or shoulder 56 by which the bearing is supported by the upper facing surface of the plate 42. The upper surface of shoulder 56 seats a distributor wheel or disc 57 for rotation. Distributor wheel 57 is keyed to shaft 53 for rotation therewith, as by pin 59 inserted through hub 58, best shown in Figure 8.

The upwardly facing surface of distributor wheel 57 is provided with a plurality of curved radial baffles or vanes 60 which are positioned in spaced relationship with one another and serve as arcuate faced guides for controlling the discharge of seeds from distributor wheel 57. It can be readily understood that as the centrifugal force caused by the rotation of wheel 57 forces seed outwardly toward the peripheral edge of the wheel the seed is guided along pathways formed by the curved vanes 60.

To prevent seed from spreading outward from the trailing edge of the seeder an elongated baffle 68 is secured onto the upper facing surface of plate 42 adjacent the trailing periphery of distributor wheel 57. Referring to Figures 4 and 9 it will be noted that baffle 68 is angled slightly forwardly toward the leading edge of hopper 10 as the baffle extends in the direction of side wall 11. Distributor wheel 57 is of such diameter and is so located that a portion of its peripheral edge extends outwardly from below the juncture of bottom wall 15 with side wall 12 and front wall 13. This assures an unobstructed area from which seed may be spread both forwardly and laterally from the seeder onto the ground. Elongated baffle 68 prevents seed from being distributed from the trailing edge of the apparatus and assists in guiding seed laterally outward below the juncture of side wall 11 and bottom wall 15. It can thus be readily seen that the position of distributor wheel 57 allows seed to be broadcast laterally from both sides of the apparatus as well as directly into the path of the device as it is moved forward by the operator. Thus, a wide "swath" is spread as the seeder is moved forward and the area of distribution may be readily observed by the operator reducing the possibility of blank or missed areas between adjacent "swaths."

Shaft 53 extends upwardly from distributor wheel 57 through an aperture within the top plate 16 of the U-shaped yoke and hopper bottom wall 15. An agitator comprising a cylindrical pin or rod 65 disposed parallel with the bottom wall of hopper 10 is secured into the upper end of shaft 53 so that it rotates with the shaft spaced immediately above the bottom wall 15 of hopper 10. Its rotation prevents the clogging and bridging of materials in the bottom of the hopper.

Bottom wall 15 is provided with a relatively large rectangular opening 66 which exposes the upper surface of yoke plate 16, as shown in Figures 4, 5 and 6. An elongated discharge opening or slot 67 extends through plate member 16 within the rectangular opening 66 for discharging material from the hopper 10 onto distributor wheel 57. The opening 67 is generally in the shape of an elongated rectangular slot intersected at one end by an oblique trapezoidal slot. Its rectangular base is inclined at about a 30 to 45 degree angle with respect to the front wall of the hopper and is positioned adjacent shaft 53. The obliquely inclined trapezoidal portion of the slot is positioned directly to the rear of shaft 53, and immediately above the trailing edge of hub 58 so that seeds and the like passing through this part of opening 67 will fall near the center of wheel 57. The trapezoidal portion of the slot is restricted and of lesser width than its forward rectangular extension. It is thus readily seen that the shape of opening 67 allows a greater rate of discharge at its outer rectangular extension than through the restricted oblique portion, thereby distributing a greater amount of seed at the outer portion of wheel 57 where the area between baffles 60 is greatest. The rotating agitator 65 sweeps over opening 67 to prevent the seed from packing and clogging over opening 67.

A pair of parallel elongated rectangular slide guides 69 are welded or otherwise secured on the bottom surface of the plate 16. They are positioned parallel with side walls 11 and 12 of hopper 10 on opposite sides of discharge slot 67. A parallel sided slide valve 72 is inserted within the grooves of the slide guide 69 for slidable engagement therein. The leading edge 73 of slide valve 72 is formed in wide oblique angled configuration similar to that of opening 67 so that when slidably positioned in its forwardmost extension it will completely close opening 67 and at other positions will reduce the size of opening 67 substantially equally along its whole length. Slide valve 72 is provided with a large rectangular opening 74 centrally disposed therein rearwardly of the leading edge and a downturned tongue 75 is integrally joined to the trailing edge of the opening 74. The end of tongue 75 is apertured to receive the lower end of flexible rod 32 which is pivotally attached thereto. Inasmuch as valve 72 is slidably engaged in the grooves of the slide guides 69 it will be readily understood that, by extending or retracting shaft 32 by means of handle 40, a forward and rearward motion is imparted to the valve 72 thus moving the leading edge 73 into and out of engagement with discharge opening 67. Opening 67 may be opened or closed in this manner. The lower end of shaft 32 has an upwardly extending hook-like portion for pivotal attachment in the aperture of tongue 75. The vertically extending hook-like portion at the lower end of flexible shaft 32 abuts against the rearwardly facing surface of baffle 68 to limit the forward motion of valve 72, as best shown in Figure 8.

Valve slide 72 has an arcuate trailing edge 76 which slidably engages vertical portion 50 at the lower end of control arm 33 when the latter is moved from the position shown in Figure 6 to the positions shown in Figures 4 and 5. It will be readily seen that the engagement of vertical portion 50 with arcuate edge 76 moves valve member 72 forward along the slide guide grooves and thus leading edge 73 is moved forward to restrict the size of discharge opening 67. It can also be seen that as valve 72 is urged rearwardly by rod 32 its rearward movement is limited by the position of vertical portion 50 of control arm 33 which serves to limit the distance which valve 72 may be moved to open slot 67. Thus by setting arm 33 in the desired position along the top edge of wall 14 the operator regulates the maximum width of opening 67 by moving valve 72 into the desired closure position. Valve 72 may then be completely closed by manipulation of handle 40 and shaft 32 but it cannot be opened wider than the width predetermined by position of control arm 33 acting by its vertical portion 50 upon the trailing edge 76 of the slide damper. When it is desired to commence the spreading operation, handle 40 is pulled to open valve 72 to the predetermined position regulated by the position of arm 33.

When operating the distributor and the slide valve 72 is open, as indicated in Figure 6, seed or light granular or divided material placed in the hopper 10 will discharge therefrom through the discharge opening 67 in the bottom wall of the hopper onto the distributor wheel 57. The distributor wheel 57 is rotated as the seeder is moved forwardly by cooperation of pinion 55 and ring gear 25 driven from the drive wheel. The seed is then dispersed by the centrifugal force of wheel 57 onto the ground.

The operator has two means of controlling the flow of seed from the hopper onto the distributor wheel. As hereinabove described the control arm 33 may be moved from the right to left to regulate the maximum size of the discharge opening 67. As shown in Figures 4, 5 and 6, when the control arm 33 is in the extreme rightward position of Figure 6, the valve 72 is positioned at its greatest rearward extension leaving discharge opening 67 completely open. While in this position seeds may be discharged through the opening 67 in high volume onto distributor wheel 57. As control arm 33 is moved leftwardly contact is made with the arcuate trailing edge 76 thus forcing valve 72 forward in its guides 69—69. When arm 33 is moved to a position parallel to the longitudinal axis of the distributor as shown in Figure 4, the leading edge 73 of valve 72 partially closes the opening 67. It is of course understood that as opening 67 is decreased by the forward motion of valve 72 the rate of flow of seeds from hopper 10 onto distributor wheel 57 is decreased and the resultant thickness of the "swath" being spread also decreases. By moving control arm 33 to the bar left as shown in Figure 5, valve 72 almost completely closes opening 67 permitting the spreading of a light layer.

Thus it is seen that the predetermined setting of the control valve may be had by moving the control arm 33 to the desired position along the top edge of wall 14. Clamp 34 provides means for locking control arm 33 in the desired position. Once the operator locks arm 33 in position he may then completely close opening 67 by pushing handle 40 of rod 32 which imparts a forward motion to valve 72 as hereinabove explained. Thus the seeding operation may be terminated and the hopper may be loaded or stored without disturbing the predetermined valve setting. When seeding is recommenced and it is desired to use the predetermined valve setting, the operator merely pulls handle 40 outward which moves valve 72 rearwardly until it abuts portion 50. Valve 72 is thus spaced automatically in a predetermined relationship with opening 67.

It is also seen that the rotating distributor mechanism and discharge valve are all uniquely housed within the U-shaped yoke member and its integrally depending legs 18. The discharge valve and distributor wheel with their coacting driving mechanism are all confined within U-shaped yoke member. The yoke is relatively simple in design and inexpensive to construct yet all of the cooperating means to discharge seed from hopper 10 onto the ground are positioned therein for easy maintenance.

In event the operator desires to use the hopper as a wheelbarrow rather than a broadcast seeder, set screws 24 of collars 23 may be loosened and wheel 21 moved away from pinion 55 so that ring gear 25 becomes disengaged therefrom. Set screws 24 are reset along axle 20 in the adjusted position and the device may thus be used as a wheelbarrow or lawn cart with opening 67 maintained closed by valve 72.

As many widely differing embodiments of this invention may be provided without departing from the spirit and scope thereof, it is to be understood that I do not specifically limit myself to the embodiment disclosed herein.

I claim:

1. In an apparatus of the class described, a supporting frame comprising a U-shaped member having a flat plate-like top provided at its ends with depending legs, an axle supported in the lower portions of said legs, a traction wheel mounted on said axle, a ring gear secured to one side of the traction wheel, the plate-like top of said U-shaped frame member having an elongated discharge opening therein disposed at an angle to said axle, a hopper having its bottom wall seated upon and secured to said top plate, said bottom wall having a relatively large opening therein communicating with the discharge opening in said top plate, guide means secured to the bottom side of said top plate for slidably supporting a slide valve normally positioned to close said discharge opening, means for actuating the slide valve to vary the effective size of the discharge opening, thereby to control the rate of discharge from the hopper, an upright shaft mounted in said supporting frame and having its upper end extending into the lower portion of the hopper, a horizontally disposed vaned distributor wheel secured to said upright shaft located below the horizontal top plate of the U-shaped supporting frame for receiving the seed and horizontally broadcasting it over a wide area, means for driving the distributor wheel from the ring gear on the traction wheel, the main portion of said discharge opening extending outwardly and forwardly with respect to the axis of the distributor wheel, and the rear end thereof being in the form of a trapezoid and being offset in a forward direction from the longitudinal centerline of the main portion of the discharge opening and terminating directly rearwardly of the axis of the distributor wheel, thereby to assure uniformity in the pattern of seed broadcast from the apparatus.

2. An apparatus according to claim 1, wherein the elongated main portion of the discharge opening is rectangular in configuration, and the trapezoidal end portion thereof is gradually reduced in width from said main portion to its closed end.

3. In an apparatus of the class described, a supporting frame comprising a U-shaped member having a flat, plate-like top wall provided at its ends with depending legs, an axle supported in the lower portions of said legs, a traction wheel mounted on the axle, a ring gear secured to one side of the traction wheel, the plate-like top wall of said U-shaped frame member having an elongated discharge opening therein disposed at an angle to said axle, a hopper having its bottom wall seated upon and secured to said top wall, said bottom wall having an enlarged opening therein communicating with the discharge opening in said top wall, guide means secured to the bottom side of said top wall, a slide valve slidably mounted in said guides and normally positioned to close said discharge opening, a manually-operable control lever for moving the slide valve into a predetermined selected open position, independent means for actuating the slide valve to cut off the flow of material from the hopper through said discharge opening, thereby to control the rate of discharge from the hopper, an upright stub shaft rotatably supported in said supporting frame and having its upper end extending into the lower portion of the hopper, said shaft having a driving connection with said ring gear, a horizontally disposed vaned distributor wheel secured to said upright shaft below the top wall of said U-shaped frame member for receiving the seed and horizontally broadcasting it over a wide area, the main portion of said discharge opening extending outwardly and forwardly from the axis of the distributor wheel, and its rear end portion being in the form of a trapezoid and being offset in a forward direction from the longitudinal centerline of the main portion of the discharge opening, and terminating directly rearwardly of the axis of the distributor wheel, thereby to assure uniformity in the pattern of seed broadcast from the apparatus.

4. An apparatus according to claim 3, wherein the rear edge of the slide valve is in the form of a cam positioned to buttingly engage a portion of the control lever, and whereby lateral swinging movement of the control lever will vary the effective size of the discharge opening.

5. An apparatus according to claim 4, wherein a flexible control rod is carried by the control lever and is manually operable independently of said control lever to completely close the discharge opening when the apparatus is at rest, or is being moved from one place to another.

References Cited in the file of this patent

UNITED STATES PATENTS

| | | |
|---|---|---|
| 1,058,103 | Rittenhouse | Apr. 8, 1913 |
| 2,535,414 | Heidger | Dec. 26, 1950 |
| 2,661,955 | Sherer | Dec. 8, 1953 |
| 2,687,891 | Puckette | Aug. 31, 1954 |
| 2,843,387 | Speicher | July 15, 1958 |